(12) United States Patent
Fu

(10) Patent No.: US 7,987,377 B2
(45) Date of Patent: Jul. 26, 2011

(54) SYSTEM FOR PREVENTING UNAUTHORIZED ACTIVATION OF COMPUTER

(75) Inventor: Chang-Wen Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 978 days.

(21) Appl. No.: 11/858,127

(22) Filed: Sep. 20, 2007

(65) Prior Publication Data
US 2008/0263682 A1   Oct. 23, 2008

(30) Foreign Application Priority Data
Apr. 17, 2007   (CN) .......................... 2007 1 0200469

(51) Int. Cl.
*G06F 1/00* (2006.01)
(52) U.S. Cl. ....................................... 713/310; 713/300
(58) Field of Classification Search .................. 713/300, 713/310
See application file for complete search history.

(56) References Cited

U.S. PATENT DOCUMENTS

| | | | | |
|---|---|---|---|---|
| 4,336,528 A | * | 6/1982 | Kane | 341/133 |
| 5,377,269 A | * | 12/1994 | Heptig et al. | 726/20 |
| 5,406,261 A | * | 4/1995 | Glenn | 340/571 |
| 5,925,128 A | * | 7/1999 | Harmon | 726/36 |
| 6,453,423 B1 | * | 9/2002 | Loison | 713/310 |
| 6,697,962 B1 | | 2/2004 | McCrory et al. | |
| 7,017,056 B1 | * | 3/2006 | Lettang et al. | 713/310 |
| 7,269,747 B2 | * | 9/2007 | Catherman et al. | 713/300 |
| 7,725,742 B2 | * | 5/2010 | Hirai et al. | 713/300 |
| 2005/0198634 A1 | * | 9/2005 | Nielsen et al. | 718/100 |
| 2008/0043769 A1 | * | 2/2008 | Hirai | 370/420 |

FOREIGN PATENT DOCUMENTS

| | | | |
|---|---|---|---|
| JP | 4-68415 | * | 3/1992 |
| JP | 2006-072446 | * | 3/2006 |
| WO | WO2005/059747 | * | 6/2005 |

* cited by examiner

*Primary Examiner* — Chun Cao
(74) *Attorney, Agent, or Firm* — Frank R. Niranjan

(57) ABSTRACT

An exemplary network system includes a remote computer and a network server. The remote computer includes a baseboard management controller (BMC), a south bridge chipset, a power button, and a switching circuit. The switching circuit has a control terminal connected to an output of the BMC, a power terminal connected to a power supply, and also connected to a SB_PWRBTN pin of the south bridge chipset, and a ground terminal connected to ground via the power button. The network server is connected to an input of the BMC of the remote computer, the network server outputs a control signal for forbidding activating the remote computer, the BMC receives the control signal and outputs a low level voltage signal to turn off the transistor, and the remote computer can not be activated.

13 Claims, 1 Drawing Sheet

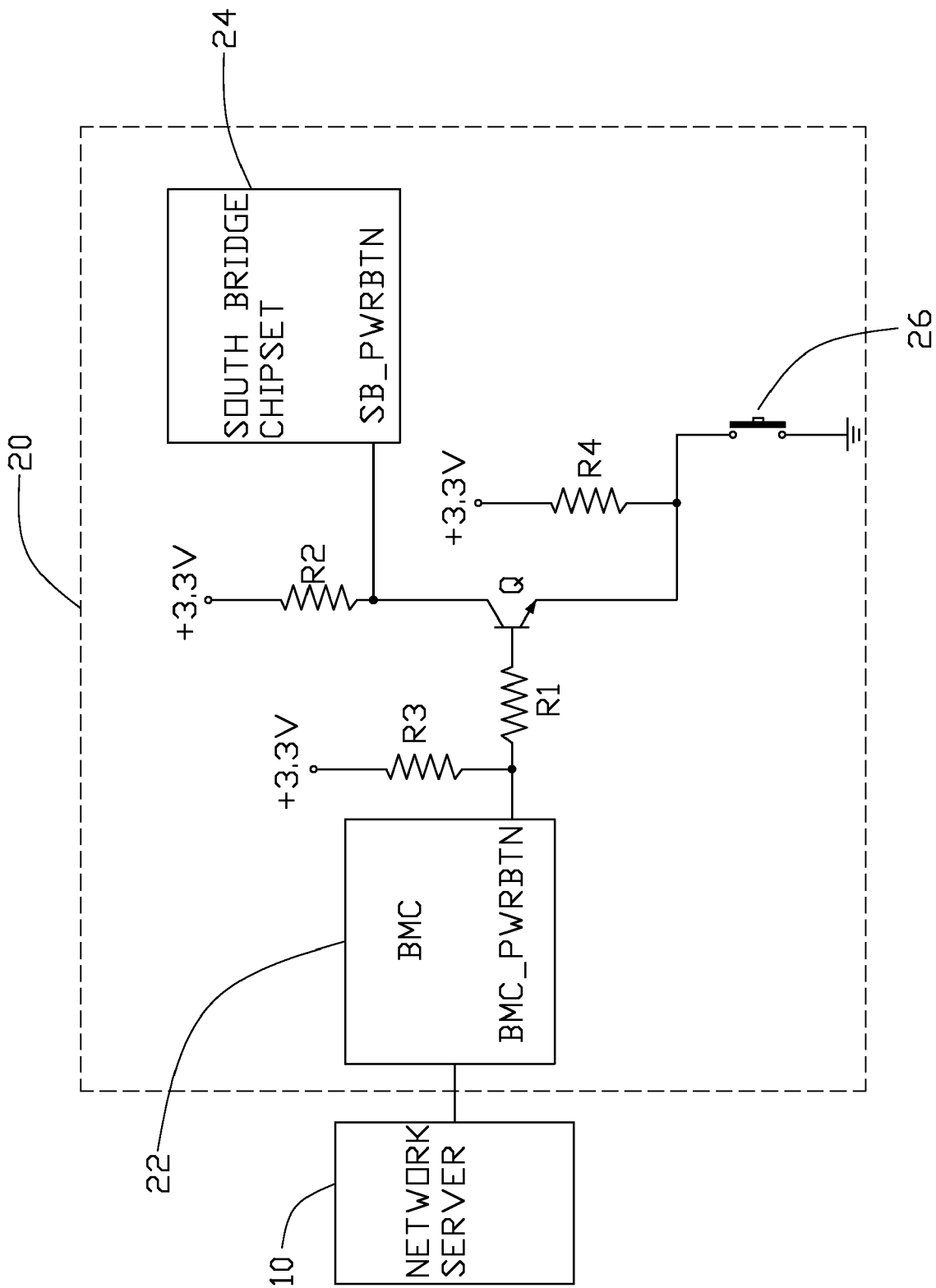

SYSTEM FOR PREVENTING UNAUTHORIZED ACTIVATION OF COMPUTER

BACKGROUND

1. Field of the Invention

The present invention relates to network systems, and particularly to a system which can prevent unauthorized powering up of a computer.

2. Description of Related Art

Usually network-based systems, such as a bank network system, includes a network server and a lot of remote computers which can access the network server through network. Robust security is important for the network-based systems, particularly for the bank network system that deals with sensitive information, to prevent unauthorized agents from accessing data.

What is needed, therefore, is a system for preventing unauthorized activation of a computer.

SUMMARY

An exemplary network system includes a remote computer, and a network server. The remote computer includes a baseboard management controller (BMC), a south bridge chipset, a power button, and a switching circuit. The switching circuit has a control terminal connected to an output of the BMC, a power terminal connected to a power supply, and also connected to a SB_PWRBTN pin of the south bridge chipset, and a ground terminal connected to ground via the power button. The network server is connected to an input of the BMC of the remote computer, the network server outputs a control signal for forbidding activation of the remote computer, the BMC receives the control signal and outputs a low level voltage signal to turn off the transistor, and the remote computer can not be activated.

Other advantages and novel features will become more apparent from the following detailed description when taken in conjunction with the accompanying drawing, in which:

BRIEF DESCRIPTION OF THE DRAWINGS

The drawing is a schematic diagram of a system for preventing activation of a remote computer in accordance with an embodiment of the present invention.

DETAILED DESCRIPTION

Referring to the drawing, a system in accordance with an embodiment of the present invention includes a network server 10, and a remote computer 20 having a baseboard management controller (BMC) 22, a south bridge chipset 24, a power button 26, and a switching circuit. In this embodiment, the switching circuit includes an NPN transistor Q.

The network server 10 is electronically connected to an input pin of the BMC 22 via communication networks. A base of the transistor Q is connected to a BMC_PWRBTN pin of the BMC 22 via a resistor R1, a collector of the transistor Q receives a 3.3V voltage via a resistor R2, an emitter of the transistor Q is grounded via the power button 26, and also receives the 3.3V voltage via a resistor R4. A node between the BMC_PWRBTN pin and the resistor R1 receives the 3.3V voltage via a resistor R3. The 3.3V voltage is a standby voltage from a computer power supply. The collector of the transistor Q is also connected to an SB_PWRBTN pin of the south bridge chipset 24. When the SB_PWRBTN pin receives a low level voltage signal, the south bridge chipset 24 sends a signal to activate the remote computer 20.

The network server 10 can control activating the remote computer 20 when the remote computer 20 is in an S5 state. The S5 state represents a normal power-off mode, in this state, the power supply provides the remote computer 20 only with a standby voltage.

In operation, if a server administrator of the system does not want anyone to operate the remote computer 20, a control signal which prevents activation of the remote computer 20 is sent from the network server 10 to the remote computer 20 through the communication networks, the BMC 22 receives the control signal and outputs a low level voltage signal to turn off the transistor Q, a voltage at the SB_PWRBTN pin of the south bridge chipset 24 is at a high level, at this time, even if the power button 26 is pressed down, the voltage at the SB_PWRBTN pin remains high, and the remote computer 20 can not be activated. So any unauthorized access to the remote computer is prevented, and the security of the system is ensured.

If the system administrator wants to permit the remote computer 20 to be operated normally, another control signal is sent from the network server 10 to the remote computer 20, the BMC 22 receives the other control signal and outputs a high level voltage signal to turn on the transistor Q. Then, when a user presses down the power button 26, the SB_PWRBTN pin of the south bridge chipset 24 is connected to ground via the transistor Q and the power button 26, so the voltage at SB_PWRBTN pin of the south bridge chipset 24 is at a low level, the south bridge chipset 24 sends a signal to activate the remote computer 20, thus the remote computer 20 can be powered up.

In this embodiment, when the network server 10 does not send the signal to permit activation of the remote computer, even if the power button of the remote computer is pressed down, the remote computer can not be powered up, thus on-site access to the remote computer is prevented.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A network system comprising:
    a remote computer comprising a baseboard management controller (BMC), a south bridge chipset, a power button, and a switching circuit, the switching circuit having a control terminal connected to an output of the BMC, a power terminal connected to a power supply via a resistor, and also connected to an SB_PWRBTN pin of the south bridge chipset, and a ground terminal connected to ground via the power button; and
    a network server connected to an input of the BMC of the remote computer, the network server outputting a control signal for preventing activating the remote computer, the BMC receiving the control signal and outputting a low level voltage signal to turn off the switching circuit, the south bridge chipset receiving a high level signal to inactivate the remote computer even if the power button is pressed down.

2. The network system as claimed in claim 1, wherein the switching circuit comprises an NPN transistor, a base, a collector, and an emitter of the transistor acts as the control terminal, the power terminal, and the ground terminal of the switching circuit, respectively.

3. The network system as claimed in claim 2, wherein the base of the transistor is connected to the output of the BMC via a resistor.

4. The network system as claimed in claim 2, wherein the emitter of the transistor is connected to the power supply via a resistor.

5. The network system as claimed in claim 2, wherein the output of the BMC is connected to the power supply via a resistor.

6. The network system as claimed in claim 1, wherein the power supply is a standby power supply of the remote computer.

7. A network system comprising:
a remote computer comprising a baseboard management controller (BMC), a south bridge chipset, and a power button;
a network server connected to an input of the BMC of the remote computer; and
a switching circuit configured for connecting to the BMC, the south bridge chipset, and the power button, when the network server outputs a control signal to the BMC for preventing activating the remote computer, the BMC outputs a first voltage level to turn off the switching circuit, so that even if the power button is pressed down, the south bridge chipset still receives a high level voltage signal, and the remote computer is not activated.

8. The network system as claimed in claim 7, wherein when the network server outputs a control signal for activating the computer to the BMC, the BMC outputs a second voltage signal to turn on the switching circuit, the south bridge chipset receives a low level voltage signal to activate the remote computer upon switch circuit activation and pressing down the power button.

9. The network system as claimed in claim 7, wherein the switching circuit includes a transistor, a base of the transistor is connected to the BMC, an emitter of transistor is connected to the ground via the power button, and a collector of the transistor is connected to the south bridge chipset and a standby power supply via a resistor.

10. A network system comprising:
a remote computer comprising a baseboard management controller (BMC) with a BMC-PWRBTN pin, a south bridge chipset with an SB_PWRBTN pin, and a power button;
a switching circuit having a control terminal connected to the BMC-PWRBTN pin of the BMC, a power terminal connected to a power supply via a resistor and also connected to the SB_PWRBTN pin of the south bridge chipset, and a ground terminal connected to ground via the power button; and
a network server connected to an input of the BMC of the remote computer configured to output a control signal to the BMC to allow the BMC-PWRBTN pin of the BMC turning on or off the switching circuit to thereby enable or disenable the south bridge chipset to activate the remote computer.

11. The network system as claimed in claim 10, wherein when the control signal output from the network server causes the BMC-PWRBTN pin of the BMC to turn off the switching circuit, the SB_PWRBTN pin of the south bridge chipset receives a high level voltage signal to disenable the south bridge chipset to activate the remote computer whether the power button is pressed down or not.

12. The network system as claimed in claim 10, wherein when the control signal output from the network server causes the BMC-PWRBTN pin of the BMC to turn on the switching circuit and when the power button is pressed down, the SB_P-WRBTN pin of the south bridge chipset receives a low level voltage signal to enable the south bridge chipset to activate the remote computer.

13. The network system as claimed in claim 10, wherein the switching circuit comprises an NPN transistor, a base, a collector, and an emitter of the transistor acts as the control terminal, the power terminal, and the ground terminal of the switching circuit, respectively.

* * * * *